(12) United States Patent
Cleckler et al.

(10) Patent No.: US 7,162,460 B2
(45) Date of Patent: Jan. 9, 2007

(54) MEDIA TYPE IDENTIFICATION

(75) Inventors: Damon Cleckler, Pasadena, CA (US); Keith David Bussell, Los Angeles, CA (US)

(73) Assignee: Stamps.com Inc

( * ) Notice: Subject to any disclaimer, the term of this patent is extended or adjusted under 35 U.S.C. 154(b) by 0 days.

(21) Appl. No.: 10/688,548

(22) Filed: Oct. 17, 2003

(65) Prior Publication Data

US 2004/0088271 A1    May 6, 2004

(51) Int. Cl.
G06F 17/00 (2006.01)
(52) U.S. Cl. .......................... 705/408; 705/410; 705/65
(58) Field of Classification Search ................ 705/64, 705/408, 410
See application file for complete search history.

(56) References Cited

U.S. PATENT DOCUMENTS

| | | | | |
|---|---|---|---|---|
| 5,449,200 A | * | 9/1995 | Andric et al. ................. | 283/67 |
| 5,651,238 A | * | 7/1997 | Belec et al. ................... | 53/504 |
| 6,192,165 B1 | * | 2/2001 | Irons .......................... | 382/306 |
| 6,311,240 B1 | * | 10/2001 | Boone et al. ................. | 710/74 |

FOREIGN PATENT DOCUMENTS

JP    2002182565    *    6/2002

* cited by examiner

Primary Examiner—Elisca Pierre Eddy
(74) Attorney, Agent, or Firm—Khorsandi Patent Law Group, A Law Corporation; Marilyn R. Khorsandi

(57) ABSTRACT

The exemplary embodiment of the present invention provides methods and systems for automatically selecting a media type for which to format Value-Bearing Item indicia based on a user's input of a secured paper control number. The exemplary embodiment of the present invention provides a method for selecting a media type format for which to generate value-bearing item indicia, said method comprising receiving an input of a secured paper control number, and identifying a media type format corresponding to the secured paper control number. The exemplary embodiment of the present invention provides a method for determining a media type for a particular unit of secured paper, said method comprising receiving an input of a media type identifier, wherein the media type identifier is displayed on the particular unit of secured paper, and retrieving from a memory storage a record corresponding to the media type identifier, wherein said record defines a media type format corresponding to the media type identifier. The exemplary embodiment of the present invention provides a method for identifying to a system a secured paper media type, said method comprising displaying on a particular unit of secured paper a secured paper identifier wherein the particular unit of secured paper corresponds to a particular media type, said media type characterized by a set of media type information, and recording on a database a relationship between the secured paper identifier and the corresponding media type information.

20 Claims, 8 Drawing Sheets

MEDIA TYPE IDENTIFICATION

CROSS REFERENCE TO RELATED APPLICATIONS

The entire contents and disclosures of U.S. patent application Ser. No. 10/197,044, titled "Generic Value Bearing Item Labels", filed Jul. 16, 2002, to be commonly assigned, which is a continuation-in-part of U.S. patent application Ser. No. 09/975,532, filed Oct. 10, 2001, entitled "SYSTEM AND METHOD FOR PROVIDING COMPUTER-BASED POSTAGE STAMPS" which claims the benefit of U.S. Provisional Application No. 60/239,424 filed Oct. 10, 2000, entitled "A SYSTEM AND METHOD FOR PROVIDING COMPUTER BASED POSTAGE STAMPS" are hereby expressly incorporated by reference for all purposes as if fully set forth herein.

The entire contents and disclosures of U.S. patent application Ser. No. 09/905,329, filed Jul. 13, 2001, entitled "WEB-ENABLED VALUE BEARING ITEM PRINTING" and U.S. patent application Ser. No. 09/585,025, filed Jun. 1, 2000 and entitled "ON-LINE VALUE BEARING ITEM PRINTING", to be commonly assigned, are hereby expressly incorporated by reference for all purposes as if fully set forth herein.

FIELD OF THE INVENTION

The field of the present invention is printing of value bearing items, and more particularly, identifying media type to a system for printing of value bearing items.

BACKGROUND OF THE INVENTION

Value Bearing Items ("VBI") include among other things, postage, coupons, tickets, gift certificates, currency, money orders, vouchers and the like. U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the contents and disclosures of which are incorporated in full herein, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as postage, that may be used at any time for any recipient, much like pre-printed postage printed and sold by the United States Postal Service ("USPS"). The term "generic postage" as used herein refers to postage that is non-recipient specific and/or non-date specific.

The Generic VBI Invention disclosed a user interface via which a user could enter postage specifications, such as a mail class and an amount. Some generic Value Bearing Items (VBI) systems provide a user with an option of media type, such as various multi-part label sets, on which to print the particular generic VBI indicia, such as generic postage indicia. For example, a computer-based generic VBI system could provide alternative selections of single-feed sheet labels and label rolls, such as through a user interface display screen drop-down menu.

Media type is the type of physical media on which something, in this case, VBI, is to be printed. A particular-dimensioned envelope is a media type. A particular-dimensioned card is another media type. A particular-dimensioned piece of paper is yet another media type. Various label manufacturers could provide distinct multi-part label set configurations, each label set configuration being yet another media type. Further still, single-part label set configurations could provide distinct label dimensions and spatial relationships between labels.

Each media type may have particular formatting requirements. For example, spatial relationships between components of what is to be printed, e.g., VBI, could vary from one media type to another. As another example, spatial relationships between components of what is to be printed, e.g., VBI, and the dimensions of the media type on which it is to be printed, could vary from one media type to another. That is, for a first distinct single-part label set configuration, a bar code may need to be printed in a particular location on each label of the particular label set. If a second single-part label set configuration were used, using the format for the first distinct label set configuration to print the bar code on the second single-part media type could result in the bar code being printed in a position outside, or partially outside, of the perimeter of a particular label.

Therefore, before printing VBI, a user needs to identify to, in an example case, the generic Value Bearing Items (VBI) system, the particular media type on which to print. One way that media type selection is identified to a system is by selecting from a list of available media types supported by the particular system. Sometimes, lists of available media types are identified with graphic icons and/or text. Once a user has identified to a system a particular media type on which to print, the system, e.g. the generic VBI system, can then generate the information to be printed, e.g., generic VBI indicia, in a format corresponding to the particular media type selected.

The term "form factor" is sometimes used herein to refer to an indicator, or identifier, of a particular media type.

As manufacturers make new media types on which to print information such as VBI, or generic VBI indicia, a system for printing such information, e.g., a generic VBI system, will need to add each new form factor to the respective user interface media type selection feature. As more and more manufacturers make media types on which to print generic VBI indicia, the list of available and supported form factors/media types will become increasingly longer.

Some VBI systems, such as computer-based generic VBI systems, use graphic icons and/or text to identify each media type available and supported by the particular system. A list of available and supported media types/form factors may be presented, for example, in a pull-down menu. As will be understood by someone with ordinary skill in the art, a pull-down menu on any particular user interface display screen is limited in space. As the list of available and supported form factors becomes increasingly longer, some VBI systems decrease the size of displayed graphic icons and/or text in order to accommodate the limited display space of online user interface displays. The smaller the graphic icon and/or the shorter the descriptive text, and the longer the list of available media type options, the more confusing, inconvenient, and/or time-consuming it can be for a user to identify and select the appropriate media type/form factor from the list.

A better way of indicating the media type identification to a computer-based VBI system is needed.

SUMMARY OF THE INVENTION

The exemplary embodiment of the present invention provides methods and systems for automatically selecting a media type for which to format Value-Bearing Item indicia based on a user's input of a secured paper control number.

The exemplary embodiment of the present invention provides a method for selecting a media type format for which to generate value-bearing item indicia, said method comprising receiving an input of a secured paper control number, and identifying a media type format corresponding to the secured paper control number.

The exemplary embodiment of the present invention provides a method for determining a media type for a particular unit of secured paper, said method comprising receiving an input of a media type identifier, wherein the media type identifier is displayed on the particular unit of secured paper, and retrieving from a memory storage a record corresponding to the media type identifier, wherein said record defines a media type format corresponding to the media type identifier.

The exemplary embodiment of the present invention provides a method for identifying to a system a secured paper media type, said method comprising displaying on a particular unit of secured paper a secured paper identifier wherein the particular unit of secured paper corresponds to a particular media type, said media type characterized by a set of media type information, and recording on a database a relationship between the secured paper identifier and the corresponding media type information.

BRIEF DESCRIPTION OF THE DRAWINGS

These and other features, aspects, and advantages of the present invention will become better understood with regard to the following description, appended claims, and accompanying drawings in which:

DETAILED DESCRIPTION OF THE INVENTION

Figure 1:
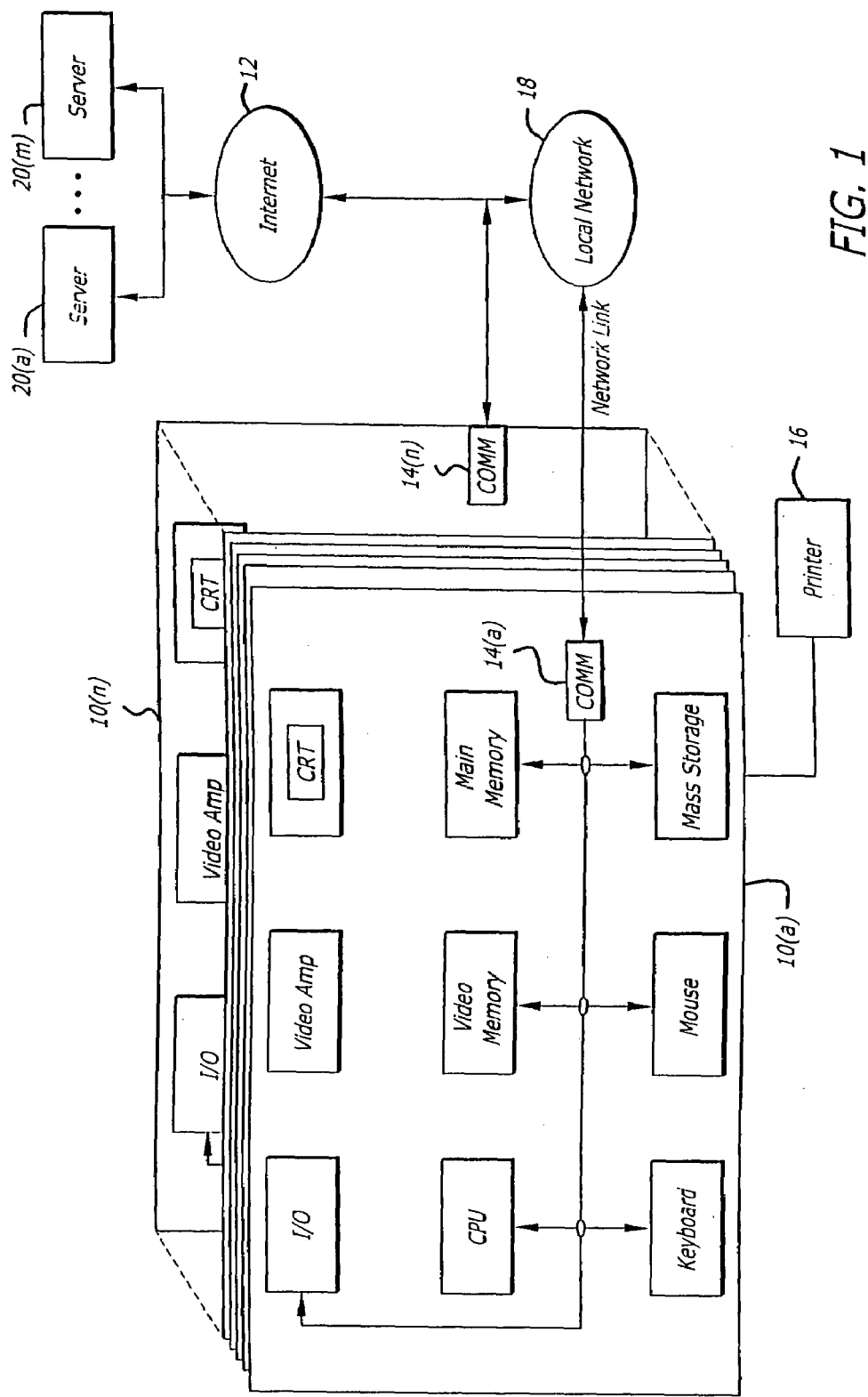
FIG. 1 is a block diagram depicting an exemplary Internet client/server environment used by an exemplary on-line postage system embodiment of the present invention.

The exemplary embodiment of the present invention is provided by an exemplary computer-based, software-based, online postage system. However, it will be understood by someone with ordinary skill in the art that the present invention may be implemented by a variety of generic postage metering systems in accordance with a variety of print requirements promulgated by postal systems around the world. Further, although an exemplary operation of the present invention is described below in accordance with USPS requirements for PC-based postal printing, the present invention is not limited to applications in accordance with the USPS requirements. Rather, the present invention is equally applicable for operation in all PC postage printing and VBI indicia printing systems.

Computer-based, software-based, on-line postage systems are now well-known in the art. An example software-based, on-line postage system is described in U.S. patent application Ser. No. 09/163,993 filed on Sep. 29, 1998, entitled "On Line Postage System", the contents of which are hereby incorporated by reference for all purposes as if fully set forth herein. As therein disclosed, an exemplary on-line postage system software comprises user code, also sometimes referred to as client software, that resides on each client system accessing an on-line postage enabled server system; controller code resides on the on-line postage-enabled server system. An exemplary on-line postage system may comprise a user/client system electronically connected to a server system, which in turn is connected to a USPS system. The server system is preferably capable of communicating with one or more client systems simultaneously.

In order to print VBI indicia, such as postage stamps, using an exemplary software-based on-line VBI indicia system, a user first registers (user registration is typically a one-time event, but would not necessarily be so) with the system; in the case of postage, the user obtains a license from the USPS to print postage. In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing postal indicium for the granted amount to a printer so that the postal indicium is printed on the print media, such as for example a label. Once the postage information is printed on an individual label it may be subsequently placed on an individual mail piece with a recipient of the users choosing and mailed and processed by the USPS.

In one embodiment, the PSD server provides an ascending register ("AR") that records the amount of postage that is dispensed or printed on each transaction and a descending register ("DR") that records the value or amount of postage that may be dispensed and decreases the amount remaining from an original amount by a charged amount as postage is printed. An exemplary PSD may further include a device ID, indicia key certificate serial number, licensing ZIP code, key token for the indicia signing key, date and time of last transaction, a last challenge received from the client, an operational state of the PSD, expiration dates for keys, a passphrase repetition list and the like.

FIG. 1 is a block diagram depicting an exemplary Internet client/server environment used by an exemplary on-line postage system embodiment of the present invention. As depicted in FIG. 1, clients 10*a*—10*n* and servers 20*a*–20*m* engage in two-way communication over a suitable communication network 12. In one embodiment, communication network 12 comprises the Internet. It will be understood by those skilled in the art that the communication network may take many different forms, such as a local area network (LAN), wide area network (WAN), wired telephone network, wireless network, or any other network that supports data communication between respective entities.

The clients 10*a*–10*n* may take many different forms, and in one illustrative embodiment comprise personal computers and printer, with the personal computers being linked to a PSD. Alternatively, the clients 10*a*–10*n* may comprise computers or any other device that has processing capabilities and that may engage in communication over communication network 12. Clients 10*a*–10*n* may be connected to the communication network 12 through communication links 14*a*–14*n*. In addition, each client preferably has access to a printer such as printer 16. Optionally, a local network 18 may serve as the connection between some of the clients, such as the PC 10*a* and the Internet 12. Servers 20*a*–20*m* are also connected to the Internet 12 through respective communication links.

The exemplary system utilizes special paper label stock to protect against the fraudulent production of generic postage stamps. Such special paper label stock may be available through a generic VBI service provider, through retail outlets or other sources. In one embodiment of label stock, multiple labels are placed on a single large set (sheet or roll) of label stock. The multiple labels may be arranged in any fashion. In one embodiment of a label sheet, the labels are arranged in a rectilinear grid pattern. In another embodiment of label stock, multiple labels are arranged in a linear fashion placed on a roll of label stock.

In the exemplary embodiment, a master serial number is used to track the production, distribution, and use of a particular unit of label stock.

In the exemplary embodiment, a unique control number, herein sometimes referred to as a serial number, uniquely identifies each label used to generate a postage stamp. Each such serial-number-controlled postage label is referred to herein as a Postagio label. Paper stock, such as label stock, controlled with serial numbers, is sometimes referred to herein as secured paper. As will be understood by someone with ordinary skill in the art, serial-number-controlled label and paper stock is not limited to Postagio labels. Other non-limiting examples of secured paper controlled using serial numbers include check stock.

In the exemplary embodiment, the Postagio serial number comprises a 9-digit numeric master Serial Number that applies to the particular unit of label stock and a 3-digit numeric minor label extension that, in combination with the master serial number, uniquely identifies the particular Postagio label. The two numbers are visually separated by a point, or period.

In an alternative exemplary embodiment, Postagio label serial numbers are alphanumeric serial numbers, generated from a 28-character set. The alphanumeric serial numbers will be broken up visually for the customer to reduce data entry errors. The master serial number will contain a checksum value and will help prevent incorrect sheet values.

Figure 2:
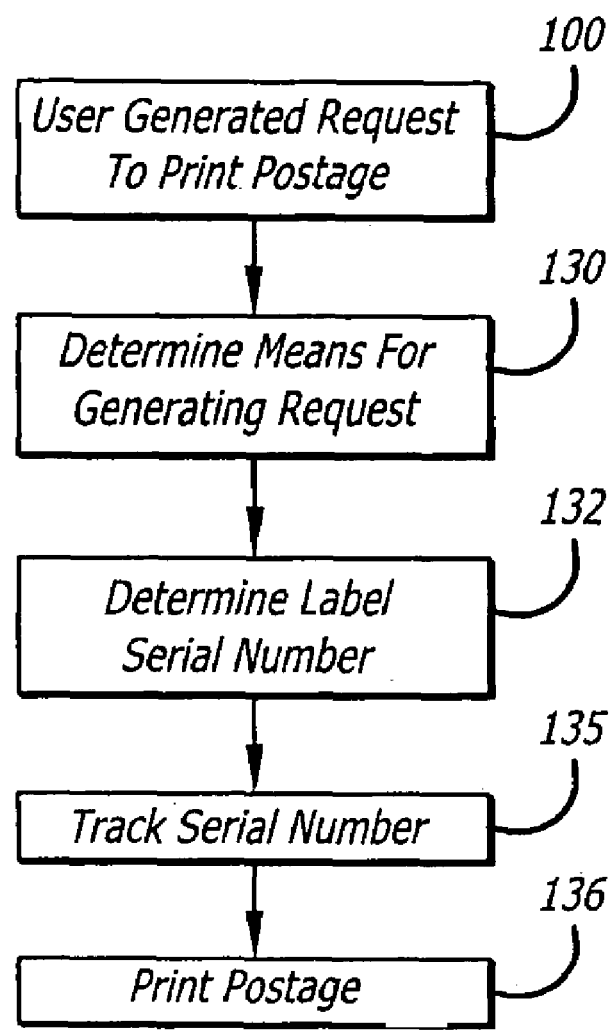
FIG. 2 is a high-level flow diagram depicting high level functionality of the exemplary operation of an exemplary system for generating generic postage in an exemplary embodiment of the present invention.
Figure 3:
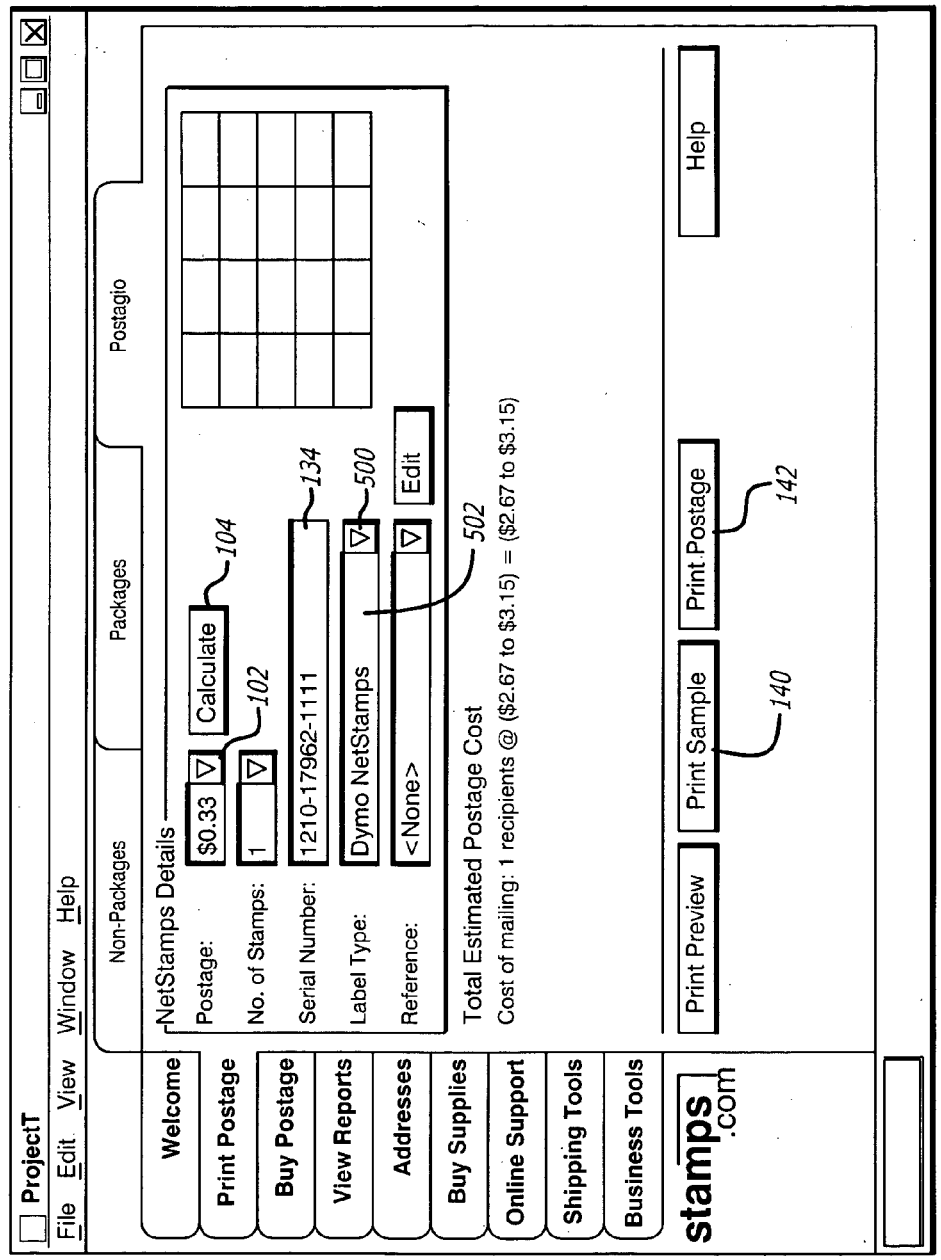
FIG. 3 is a graphic representation depicting a screen shot of an exemplary generic postage printing user interface in an exemplary embodiment of the present invention.

FIG. 2 is a high-level flow diagram depicting high level functionality of the exemplary operation of an exemplary system for generating generic postage in an exemplary embodiment of the present invention. As depicted in FIG. 2, a user first enters 100 a request to print the desired postage. The exemplary software-based on-line generic postage system provides a user interface comprising a plurality of user interface input screens via which a user may specify and print generic postage stamps for use with one of a plurality of postage classes, including standard first class service as well as other specialty services. For example, an exemplary user interface input screen such as the one depicted in FIG. 3, provides wizard-based prompts to assist users in determining the type/class of postage to print. In addition, a second interface is provided that allows customers to simply enter the postage rate and print generic postage stamps.

Referring again to FIG. 2, in the exemplary embodiment, the indicia generation process determines 130 whether a print wizard was used to generate the request to print generic postage stamps. If a print wizard was used to generate the request, the class selected within the wizard will be the class included in the generic postage stamps. If the wizard was not used, the rate class will default to first class. In the exemplary embodiment, a user may select any denomination of postage desired, up to the maximum limit defined by the PCIBI-O, that is currently $999.99.

As depicted in FIG. 2, the exemplary system then determines 132 the label serial number. One way in which the label serial number is determined is by way of a master serial number entered by a user.

Continuing with reference to FIG. 2, in the exemplary embodiment, master serial numbers and pre-printed serial numbers are tracked 135 by the server. When a unit of label stock has been used, the server flags the meter number that used label stock associated with the master serial number. If the user prints generic postage stamps on a portion of label stock, the user will be able to print indicia on the remaining labels included in the label stock at a later time. However, only the meter that initially used the label stock will be permitted to print the remaining labels.

Once all labels included in the label stock have been printed, the associated master serial number and preprinted serial numbers will be flagged, and any attempts to print a label using those serial numbers will be rejected by the server. In the exemplary embodiment, all possible serial numbers will not be initially activated. Rather, only label stock and labels having serial numbers that have been produced by a manufacturer and placed into distribution will be activated and available for use. Continuing with FIG. 2, a user may print 136 postage or sample postage onto the label stock.

As depicted in FIG. 3, an exemplary user interface may include an input window 102 into which a user may enter postage information, such as for example, an amount, such as $0.33 for first class stamps, in a free form. The user interface also includes a link 104 to a postage calculator that may be used to calculate postage for specialty services such as for example, Express mail.

As depicted in FIG. 3, the exemplary user interface provides a pull-down menu button 500 with which to identify a form factor 502 (the expanded pull-down menu is not shown). However, the exemplary system will use the form factor identification process described in more detail below to automatically identify the form factor 502 according to the master serial number 134 input by the user.

Figure 6:
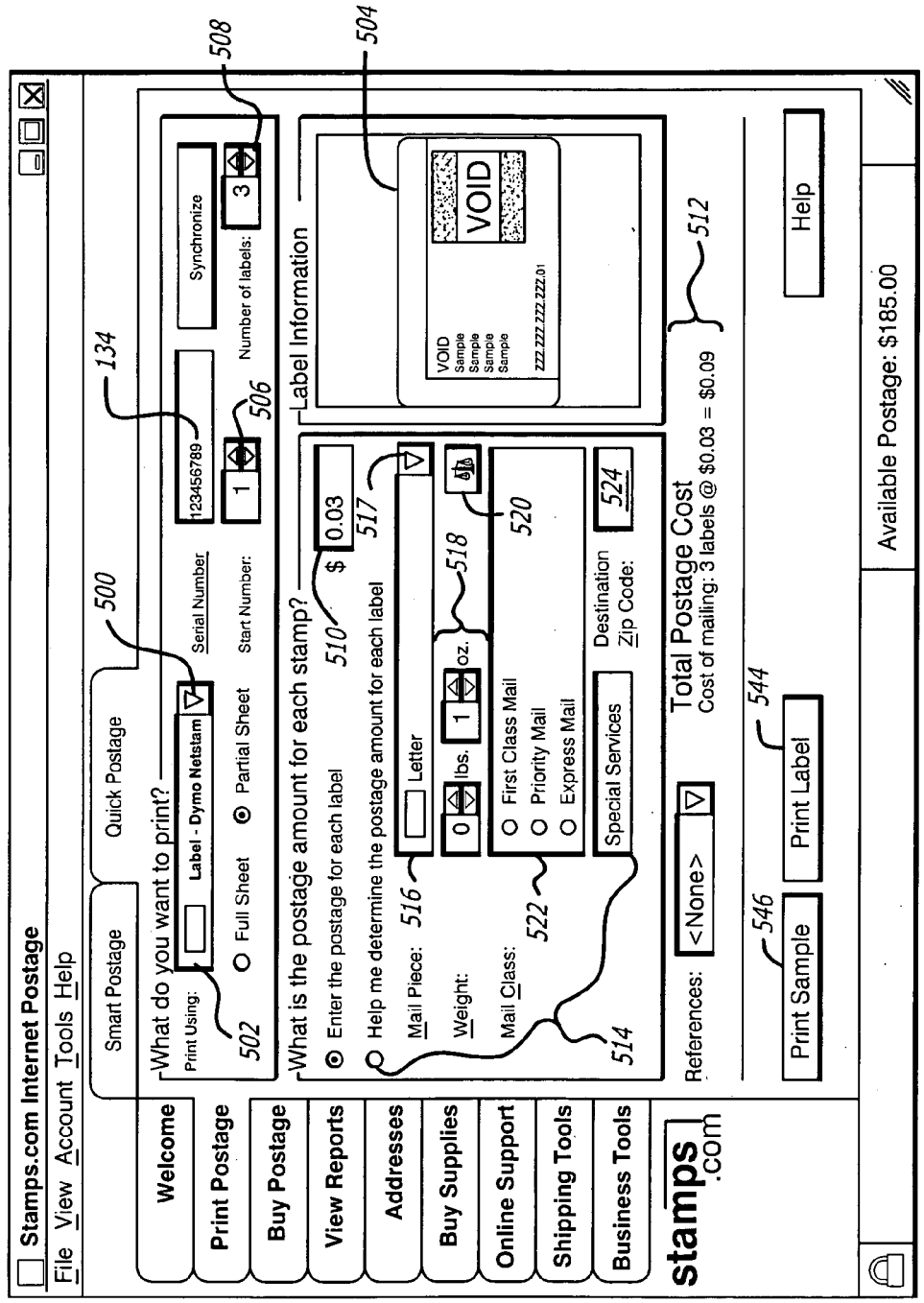
FIG. 6 is a graphic representation depicting a first screen shot of an alternative exemplary generic postage printing user interface in an exemplary embodiment of the present invention.
Figure 7:
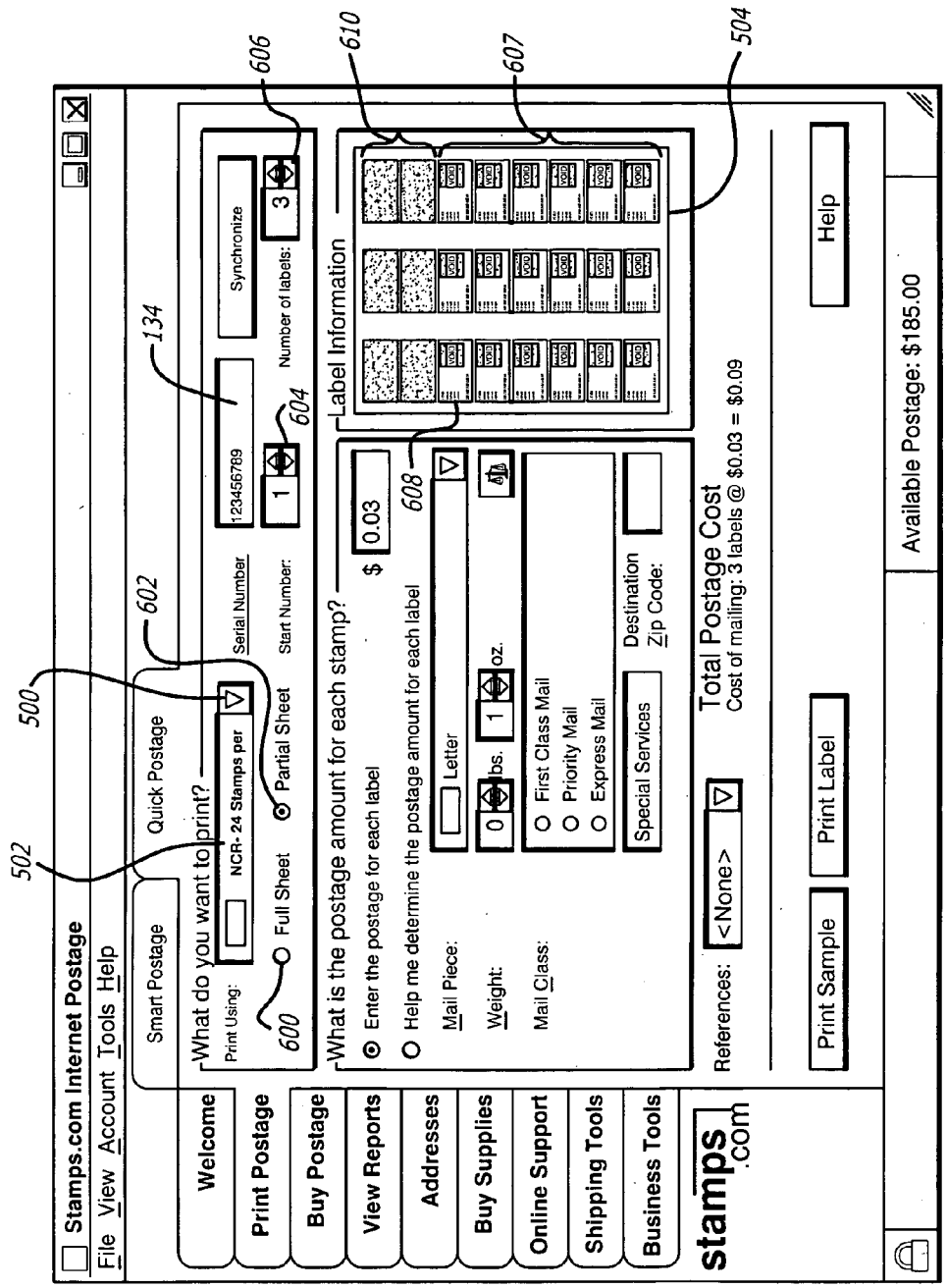
FIG. 7 is a graphic representation depicting a second screen shot of an alternative exemplary generic postage printing user interface in an exemplary embodiment of the present invention.

FIG. 6 is a graphic representation depicting a first screen shot of an alternative exemplary generic postage printing user interface in an exemplary embodiment of the present invention. FIG. 7 is a graphic representation depicting a second screen shot of an alternative exemplary generic postage printing user interface in an exemplary embodiment of the present invention. In the exemplary embodiment depicted in FIGS. 6 and 7, the exemplary system will use the form factor identification process described in more detail below to automatically identify the form factor 502 according to the master serial number 134 input by the user. Once the system has identified the form factor 502, the system will generate an exemplary label preview 504 such as is depicted in FIGS. 6 and 7.

As depicted in FIG. 7, in the case of sheet label stock, a sheet label preview 504 is generated showing labels previously printed 610 as blank labels, and showing labels available for printing 607. The sequence numbers 608 of the printable labels on the sheet label stock are shown in the sheet label stock display 504. Those labels that will not be printed are shown as blank labels 610. The exemplary label preview 504 is displayed within the user interface confirming the exemplary system's automatic selection of label stock based on the user's input of the master serial number.

In the case of a roll label stock, the label preview 504 as depicted in FIG. 6 shows a single label available for print.

It will be understood by someone with ordinary skill in the art that other system embodiments of the present invention may not provide any mechanism for user input or selection of label stock, such as is provided in FIGS. 6 and 7 (e.g., pull-down menu button 500 with which to identify a form factor 502). Such other system embodiments of the present invention would rely on the system to select the form factor exclusively based on the user's input of a master serial number.

Figure 4:
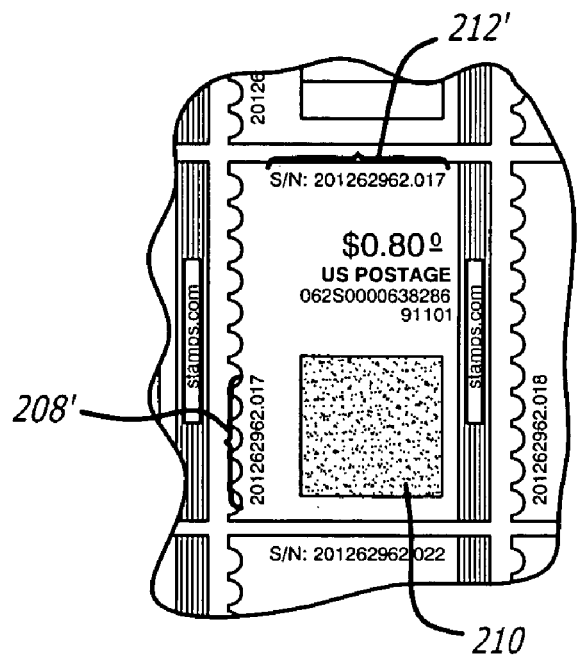
FIG. 4 is a plan view of an exemplary generic postage stamp in an exemplary embodiment of the present invention.

FIG. 4 is a plan view of an exemplary generic postage stamp in an exemplary embodiment of the present invention. When a user prints a generic postage stamp such as one depicted in FIG. 4, the exemplary system prints a serial number 212' on the non-label portion of the label stock; the exemplary system imbeds the serial number as part of the 2D bar code printed on the Postagio label.

The exemplary system prints generic postage, imbedding in the 2D bar code a serial number that matches the pre-printed serial number (208' on FIG. 4) on a particular Postagio label. As depicted in FIG. 4, an exemplary generic Postagio label will include a pre-printed serial number 208'. The pre-printed serial number 208' is a unique number printed in the bottom left-hand margin of the label to identify the sheet source and the individual label. The exemplary system further includes the pre-printed serial number in the machine-readable data matrix barcode format 210 to ensure that the stamp is unique and for USPS authentication. In the alternative exemplary embodiment, a serial number will also be printed 212 (not pictured in FIG. 4, but see FIG. 5) at the time the Postagio is created. This printed serial number 212 (not pictured in FIG. 4, but see FIG. 5) will be printed directly above (to the left of) (or below (to the right of)) the pre-printed serial number 208 as an added fraud deterrent. If the serial numbers 208 and 212 (not pictured in FIG. 4, but see FIG. 5) do not match each other and the serial number in the machine-readable data matrix barcode format 210, then the generic postage is not valid.

Figure 5:
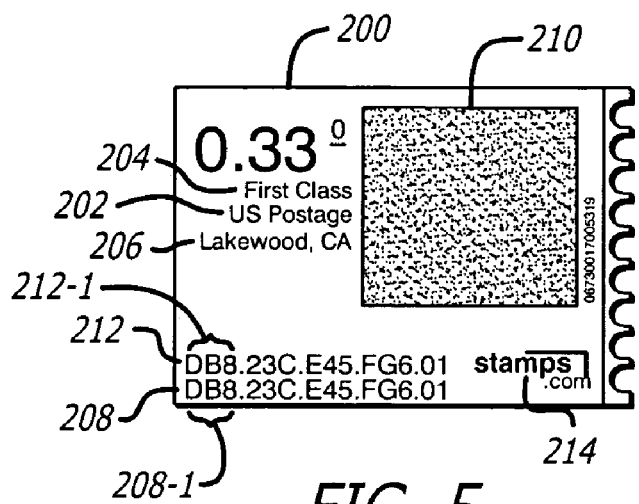
FIG. 5 is a plan view of an alternative exemplary generic postage stamp in an alternative exemplary embodiment of the present invention.

FIG. 5 is a plan view of an alternative exemplary generic postage stamp in an alternative exemplary embodiment of the present invention. As depicted in FIG. 5, when a user prints a generic postage stamp, the alternative exemplary system prints a serial number 212 as part of the indicia directly above the pre-printed serial number 208 already pre-printed on the label. In the alternative exemplary embodiment, the printed serial number 212 is the same font and size as the pre-printed number 208 on the label. Such font and size similarity between the pre-printed serial number 208 and the printed serial number 212 allows for immediate visual comparison of the numbers by USPS personnel.

Returning to FIG. 2, in the exemplary embodiment, master serial numbers and pre-printed serial numbers are tracked 135 by the server. When a unit of label stock has been used, the server flags the meter number that used the label stock. If the user prints generic postage stamps on a portion of label stock, the user will be able to print indicia on the remaining labels included in the label stock at a later time. However, only the meter that initially used the label stock will be permitted to print the remaining labels. Once all labels included in the label stock have been printed, the associated master serial number and preprinted serial numbers will be flagged and any attempts to print a label using those serial numbers will be rejected by the server. In the exemplary embodiment, all possible serial numbers will not be initially activated. Rather, only label stock and labels having serial numbers that have been produced by a manufacturer and placed into distribution will be activated and available for use. Continuing with FIG. 2, a user may print 136 postage or sample postage onto the label stock.

In the exemplary embodiment of a pre-printed serial number, a form factor identifier 208-1'/208-1 is included as part of the pre-printed serial number 208'. In the exemplary embodiment, a form factor identifier 208-1' is included as the leading 2 digits in the pre-printed serial number (e.g., 208' on FIG. 4). In the alternative exemplary embodiment, the form factor identifier 208-1 is included as the leading 3 digits in the pre-printed serial number (e.g., 208 on FIG. 5). The preceding examples of leading digits in the pre-printed serial number comprising the form factor are non-limiting illustrations.

It will be understood by someone with ordinary skill in the art that various other numbering schemes could be used to identify media type within a master serial number. It will also be understood by someone with ordinary skill in the art that in some alternative exemplary embodiments, an identifier other than a secure paper serial number could be pre-printed on label stock; the identifier would be used to identify media type; information relating the identifier to the corresponding media type could be stored in the system and used to correlate an input of an identifier to a particular media type so that information to be printed could be properly formatted for the particular media type. Such an identifier could be a form factor, or could be a special or alphanumeric character that could be translated to a form factor.

It will be understood by someone with ordinary skill in the art that various manufacturers may provide generic VBI label sets according to the particular manufacturer's specifications. Each manufacturer's VBI label sets may differ from other manufacturers' generic VBI label sets in size, dimension and configuration (configuration including, for example, specific spatial relationships between labels in a set; specific spatial relationships between label sets; and spatial relationships between labels/label sets and the stock on which the labels/label sets are provided)) features.

In the exemplary system embodiment of the present invention, a forms database (see element 1214, FIG. 8) will be provided that will identify, for each print media type (including each manufacturer's generic VBI label sets), media type information, which may include one or more of the following, but is not limited to, the size (including but not limited to the size of each label; the size of each label set; and the size of the stock on which the labels/label sets are provided), dimensions (of each label; of each label set; and of the stock on which the labels/label sets are provided) and configuration characteristics (e.g., specific spatial relationships between labels in a set; specific spatial relationships between label sets; and spatial relationships between labels/label sets and the stock on which the labels/label sets are provided) of the particular media type.

A Serial Number database (see element 1221, FIG. 8) will be provided that will identify, among other things, a print media type (form factor) for each master serial number for label stock that has been produced by a manufacturer and placed into distribution.

As described below in more detail with reference to FIG. 8, in response to a user entering a master serial number, the exemplary system will access the forms database to determine from the serial number a particular media type corresponding to the serial number. Once the exemplary system accesses the forms database and locates the forms database record corresponding to the particular media, the exemplary system of the present invention then uses the forms database media type information, such as size, dimension and configuration features information, to calculate a size and/or print location of the Data Matrix (or other barcode) for each particular generic postage stamp ordered by the user according to the media type dimensions for the selected media, and according to the user's particular printer device.

It will be understood by someone with ordinary skill in the art that the forms database could be located at any one of various places, including in the client system, in memory, or, for example, the forms database could alternatively be accessed by the server system.

It will be also understood by someone with ordinary skill in the art that the forms and Serial database information could be maintained in a single database.

Figure 8:
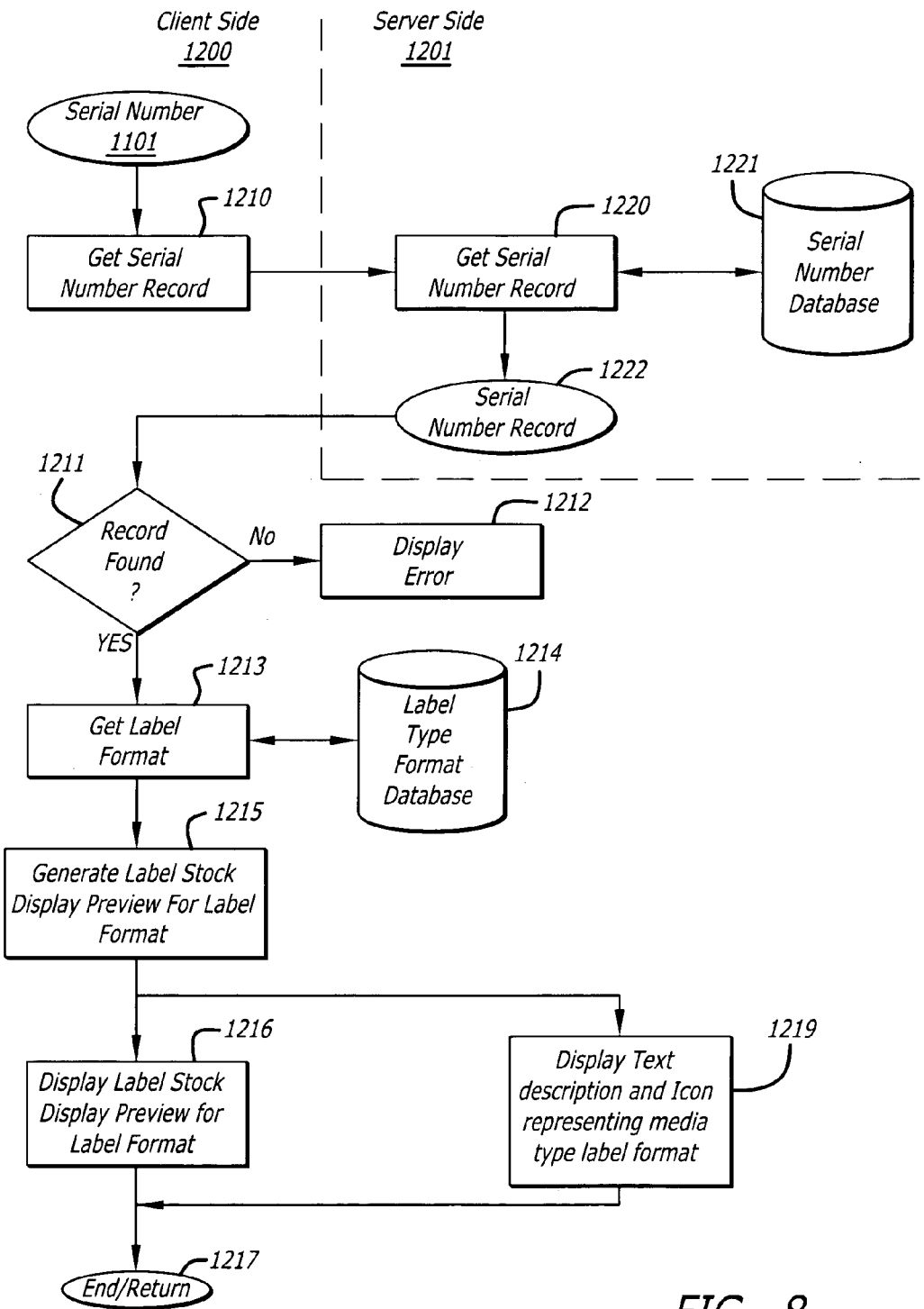
FIG. 8 is a high level flow diagram depicting high level functionality of an exemplary client side WYSIWYG interface of the present invention and certain interactive functions with the alternative exemplary server side of the present invention.

FIG. 8 is a high level flow diagram depicting high level functionality of an exemplary intuitively-based (WYSIWYG) client side user interface 1200 of the present invention and certain interactive functions with the exemplary server side 1201 of the present invention.

It will be understood by someone with ordinary skill in the art that the depiction of particular functions being performed on the client side, or the server side, of the exemplary embodiment of the present invention is illustrative; further alternative structures for function performance are possible without departing from the spirit of the present invention.

As depicted in FIG. 8, the exemplary client side WYSIWYG user interface 1200 receives the user input Serial Number 1101. In response to receiving the user input Serial Number 1101, the exemplary client side WYSIWYG user interface 1200 then instructs the server system to query the database 1221 of valid pre-printed serial numbers using the user input Serial Number 1101 as a key and get a record 1210 of information associated with the Serial Number 1101.

In response to the instructions from the client side 1200, the server side 1201 of the system reads the Serial Number Database 1221. If the server side 1201 of the system finds a match of the input Serial Number 1101 on the Serial Number Database 1221, the server side 1201 of the system returns the record 1222 of information from the Serial Number Database 1221 associated with the Serial Number 1101 to the client side 1200 WYSIWYG user interface. Serial Number Database record 1222 information includes, among other things, a media label type (form factor).

The client side 1200 tests 1211 to see if any record is found. If no record is found, then the client side 1200 displays 1212 an instructive error message to the user's display monitor. If the Server Side 1201 returns a record 1222, then the client side 1200 uses the media label type from the returned Serial Number Record 1222 to select 1213 from a Label Type (Forms) Database 1214 a media label type format corresponding to the returned media label type.

The client side 1200 then generates 1215 a label stock preview display (see, e.g., 504, FIGS. 6 and 7) corresponding to the returned label format. In the exemplary embodiment, the exemplary client side 1200 displays 1219, such as in a media type window, e.g., 500 (see, e.g., FIGS. 3, 6, and 7) a text description 502 (see, e.g., FIGS. 3, 6, and 7) of the media type corresponding to the returned label format with an icon representing the media type label format. The display 1219 of a text description and/or icon is optional. The exemplary client side 1200 then displays 1216 the label stock preview display (see, e.g., 504, FIGS. 6 and 7) to the user's display monitor, ending 1217 the initial display function of the alternative exemplary client side WYSIWYG user interface 1200.

In one embodiment of the present invention, the label stock preview display (see, e.g., 504, FIGS. 6 and 7) is interactive.

Figure 9:
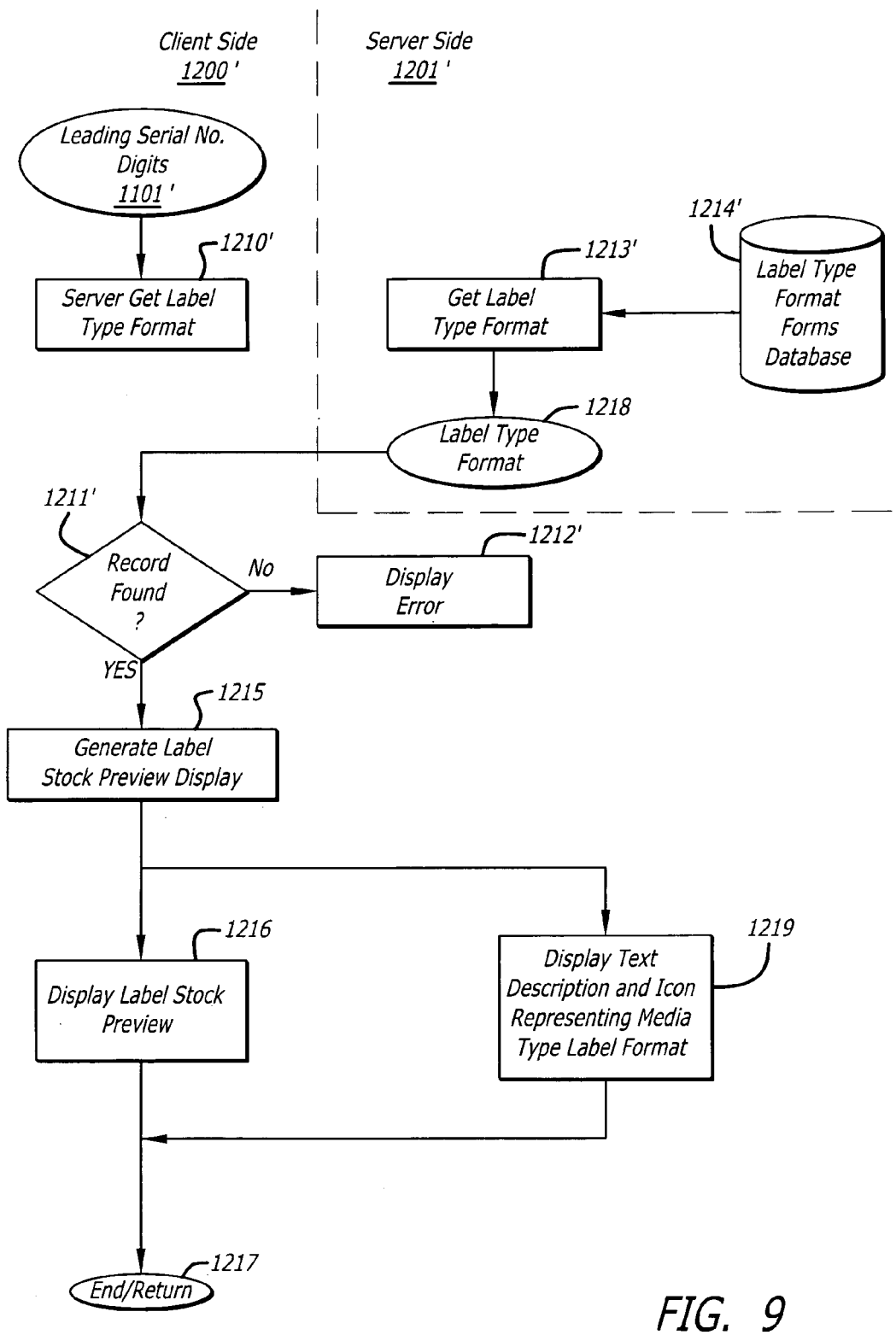
FIG. 9 is a high level flow diagram depicting high level functionality of an alternative exemplary client side WYSIWYG interface of the present invention and certain interactive functions with the alternative exemplary server side of the present invention in which only a designated leading number of digits of a user-supplied master serial number are used to identify a media label type.

In an alternative embodiment, in order to identify the media type form factor 502, only a designated number of digits of the user-supplied master serial number are needed to identify a media label type—for example, a designated leading number of digits of the user-supplied master serial number comprise a media label type identifier. The preceding description of the designated number of digits being the leading number of digits of the user-supplied master serial number is illustrative and non-limiting. Alternatively, the designated number of digits of the master serial number would not necessarily need to comprise leading digits but could be digits located anywhere within the master serial number. FIG. 9 depicts high level functionality of an embodiment in which a designated leading number of digits of the user-supplied master serial number comprise a media label type identifier.

In the embodiment depicted in FIG. 9, the Forms Database 1214' records correlate a media label type identifier to a media label type format. As depicted in FIG. 9, in such an embodiment, once the user has entered the number of leading digits necessary to identify a media label type, the exemplary client side WYSIWYG user interface 1200' receives the user input leading Serial Number digits 1101'.

In response to receiving the user input leading Serial Number digits 1101', the exemplary client side WYSIWYG user interface 1200' then instructs 1210' the server system 1201' to retrieve 1213' from the Forms Database 1214' a media label type format record 1218 corresponding to the user input leading Serial Number digits 1101'.

The client side 1200' tests 1211 to see if any media label type format record 1218 is found. If no media label type format record 1218 is found, then the client side 1200' displays 1212' an instructive error message to the user's display monitor. If the Server Side 1201 returns a media label type format record 1218, then the client side 1200' uses the media label type format record 1218 to generate 1215 a label stock preview display (see, e.g., 504, FIGS. 6 and 7) corresponding to the returned label format (1218).

In the alternative exemplary embodiment depicted in FIG. 9, the alternative exemplary client side 1200' displays 1219 a text description 502 (see, e.g., FIGS. 3, 6, and 7) of the media type corresponding to the returned label format (1218). The display 1219 of a text description and/or icon is optional. The alternative exemplary client side 1200' then displays 1216 the label stock preview display (see, e.g., 504, FIGS. 6 and 7) to the user's display monitor, ending 1217 the initial display function of the alternative exemplary client side WYSIWYG user interface 1200'.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific exemplary embodiments, many additional modifications and variations would be apparent to those skilled in the art. For example, the present invention may be implemented by a variety of generic postage metering systems in accordance with a variety of print requirements promulgated by postal systems around the world. Further, although the operation of the present invention has been demonstrated in accordance with USPS requirements for PC based postal printing, the present invention is not limited to applications in accordance with the USPS requirements. Rather, the present invention is equally applicable for operation in various PC postal printing and Value Bearing Item indicia printing systems. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A method for selecting a media type format for which to generate generic postage indicia, said method comprising:
   displaying to a display device in communication with a computer device, an input field for inputting a secured paper control number input;
   receiving from a user, via the computer device, the secured paper control number input, wherein the secured paper control number input comprises a serial number that uniquely corresponds to a particular unit of secured paper label stock, wherein the serial number comprises a plurality of characters, wherein a subset of characters of the plurality of characters that comprise the serial number comprises a media type format identifier, wherein the particular unit of secured paper label stock comprises a plurality of labels, and wherein the serial number is visible on each label of the particular unit of secured paper label stock;
   identifying a set of media type format information corresponding to the media type format identifier, for formatting at least one generic postage label, wherein the set of media type information comprises at least one of: media type size, media type dimensions or media type configuration feature; and
   calculating, according to the set of media type format information, at least one of: a printable size of a generic postage indicia for printing on an at least one label on the particular unit of secured paper label stock, or a print location of the generic postage indicia for printing on the at least one label on the particular unit of secured paper label stock.

2. The method of claim 1 for selecting a media type format, said method further comprising:
   generating a label stock preview display of the particular unit of secured paper label stock for display on the display device, wherein the label stock preview display is generated in a format according to the media type format.

3. The method of claim 1 for selecting a media type format, said method further comprising:
   generating at least one generic postage indicia for printing on the at least one label on the particular unit of secured paper label stock in a format according to the media type format.

4. The method of claim 3 for selecting a media type format, said method further comprising:
   tracking each label on the particular unit of secured paper label stock for which at least one generic postage indicia has been generated.

5. The method of claim 3, said method further comprising:
   generating for printing on the at least one label on the particular unit of secured paper label stock, a representation of the secured paper control number input.

6. The method of claim 1, wherein the media type identifier comprises a single leading character of the serial number.

7. The method of claim 1, wherein the media type identifier comprises a plurality of leading characters of the serial number.

8. A method for determining a media type for a particular unit of secured paper label stock, wherein the particular unit of secured paper label stock comprises a plurality of labels, said method comprising:
   receiving from a user, via a computer device, an input of a serial number, wherein the serial number is displayed on each label of the particular unit of secured paper label stock, and wherein the serial number uniquely identifies the particular unit of secured paper label stock;
   retrieving from a computer-accessible memory storage, a record corresponding to the serial number, wherein the record comprises a media type format identifier corresponding to the serial number and further comprises media type information selected from the group consisting of: media type size, media type dimensions and media type configuration features; and
   calculating, according to the media type format information, at least one of: a printable size of a value-bearing item indicia for printing on an at least one label on the particular unit of secured paper label stock, or a print location of the value-bearing item indicia for printing on the at least one label on the particular unit of secured paper label stock.

9. The method of claim 8 for determining a media type for a particular unit of secured paper label stock, said method further comprising:
   generating a label stock preview display for display on a display device that communicates with the computer device, wherein the label stock preview display is generated in a format according to the media type format.

10. The method of claim 8 for determining a media type for a particular unit of secured paper label stock, wherein the serial number comprises a media type identifier.

11. The method of claim 8 for determining a media type for a particular unit of secured paper label stock, said method further comprising:
formatting a set of value-bearing item indicia for printing on the at least one label on the particular unit of secured paper label stock according to at least one of: the size or the print location.

12. A method for identifying to a system a secured paper media type, said method comprising:
displaying on a particular unit of secured paper label stock a unique secured paper identifier, wherein the unique secured paper identifier comprises a plurality of characters, wherein a subset of characters of the plurality of characters that comprise the unique secured paper identifier comprises a media type format identifier, wherein the media type format identifier corresponds to a particular media type, and wherein the particular media type corresponds to a set of media type information;
identifying the set of media type information that corresponds to the media type format identifier; and
responding to an input by a user, via a computer device, of at least the unique secured paper identifier, by generating a printable format of at least one value-bearing item indicia for printing on an at least one label of the secured paper label stock, wherein the printable format of the at least one value-bearing item indicia is generated in a format according to the set of media type information that corresponds to the media type format identifier.

13. The method of claim 12 for identifying to a system a secured paper media type, wherein each unit of secured paper label stock comprises a plurality of labels, wherein each label on a particular unit of secured paper label stock bears a distinct, unique secured paper control number, wherein the distinct, unique secured paper control number uniquely identifies the particular unit of secured paper.

14. The method of claim 13 for identifying to a system a secured paper media type, said method further comprising:
tracking each label on the particular unit of secured paper label stock for which a value-bearing item indicia has been generated.

15. The method of claim 12, said method further comprising:
generating for printing on the at least one label of the secured paper label stock, a representation of the unique secured paper identifier.

16. The method of claim 12, wherein the media type format identifier comprises a single leading character of the unique secured paper identifier.

17. The method of claim 12, wherein the media type format identifier comprises a plurality of leading characters of the unique secured paper identifier.

18. A method for identifying to a system a secured paper media type, said method comprising:
displaying on a particular unit of secured paper label stock a unique secured paper identifier, wherein the particular unit of secured paper label stock corresponds to a particular media type, and wherein the particular media type is characterized by a corresponding set of media type information;
recording on at least one database a relationship between the unique secured paper identifier and the corresponding set of media type information;
responding to an input by a user, via a computer device, of at least the unique secured paper identifier, by generating an at least one value-bearing item indicia for printing on an at least one label of the secured paper label stock, wherein the at least one value-bearing item indicia is generated in a format according to the corresponding set of media type information; and
generating for printing on the at least one label of the secured paper label stock, a representation of the unique secured paper identifier.

19. A method for selecting a media type format for which to generate generic postage indicia, said method comprising:
displaying to a display device in communication with a computer device, an input field for inputting a secured paper control number input;
receiving from a user, via the computer device, the secured paper control number input, wherein the secured paper control number input comprises a serial number that uniquely corresponds to a particular unit of secured paper label stock, wherein the particular unit of secured paper label stock comprises a plurality of labels, and wherein the serial number is visible on each label of the particular unit of secured paper label stock;
identifying a media type format, according to the serial number, for formatting at least one generic postage label;
calculating, according to the media type format, at least one of: a size of a generic postage indicia for printing on an at least one label on the particular unit of secured paper label stock, and a print location of the generic postage indicia for printing on the at least one label on the particular unit of secured paper label stock;
generating at least one generic postage indicia for printing on the at least one label on the particular unit of secured paper label stock in a format according to the media type format; and
tracking each label on the particular unit of secured paper label stock for which at least one generic postage indicia has been generated.

20. A method for selecting a media type format for which to generate generic postage indicia, said method comprising:
displaying to a display device in communication with a computer device, an input field for inputting a secured paper control number input;
receiving from a user, via the computer device, the secured paper control number input, wherein the secured paper control number input comprises a serial number that uniquely corresponds to a particular unit of secured paper label stock, wherein the particular unit of secured paper label stock comprises a plurality of labels, and wherein the serial number is visible on each label of the particular unit of secured paper label stock;
identifying a media type format, according to the serial number, for formatting at least one generic postage label;
calculating, according to the media type format, at least one of: a size of a generic postage indicia for printing on an at least one label on the particular unit of secured paper label stock, and a print location of the generic postage indicia for printing on the at least one label on the particular unit of secured paper label stock;
generating at least one generic postage indicia for printing on the at least one label on the particular unit of secured paper label stock in a format according to the media type format; and
generating for printing on the at least one label on the particular unit of secured paper label stock, a representation of the secured paper control number input.

* * * * *